United States Patent
Papusoi et al.

(10) Patent No.: US 12,183,377 B2
(45) Date of Patent: Dec. 31, 2024

(54) MAGNETIC RECORDING MEDIA WITH DEAD MAGNETIC LAYER

(71) Applicant: Western Digital Technologies, Inc., San Jose, CA (US)

(72) Inventors: Cristian Papusoi, Santa Clara, CA (US); Kai Tang, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/230,559

(22) Filed: Aug. 4, 2023

(65) Prior Publication Data
US 2024/0404554 A1    Dec. 5, 2024

Related U.S. Application Data

(60) Provisional application No. 63/469,675, filed on May 30, 2023.

(51) Int. Cl.
*G11B 5/73*      (2006.01)
*G11B 5/667*     (2006.01)

(52) U.S. Cl.
CPC ............ *G11B 5/7369* (2019.05); *G11B 5/667* (2013.01); *G11B 5/7379* (2019.05); *G11B 2220/235* (2013.01)

(58) Field of Classification Search
None
See application file for complete search history.

(56) References Cited

U.S. PATENT DOCUMENTS

| | | | |
|---|---|---|---|
| 6,787,251 B1 | 9/2004 | Wu et al. | |
| 7,235,314 B2 | 6/2007 | Chen et al. | |
| 9,093,101 B2 * | 7/2015 | Kim | G11B 5/676 |
| 9,431,045 B1 | 8/2016 | Wang et al. | |
| 9,824,711 B1 * | 11/2017 | Tripathy | G11B 5/667 |

(Continued)

FOREIGN PATENT DOCUMENTS

| | | |
|---|---|---|
| CA | 1269894 A | 6/1990 |
| CN | 104021801 A | 9/2014 |

OTHER PUBLICATIONS

Qin, Gaowu W. et al., "Development of High Density Magnetic Recording Media for Hard Disk Drives: Materials Science Issues and Challenges", International Materials Reviews; May 2009; https://doi.org/10.1179/174328009X411172; 24 pages.

(Continued)

*Primary Examiner* — Kevin M Bernatz
(74) *Attorney, Agent, or Firm* — LOZA & LOZA, LLP; Gabriel Fitch

(57) ABSTRACT

A magnetic recording medium includes a rigid substrate, an amorphous soft magnetic underlayer (SUL) on the substrate, a dead magnetic layer on the SUL, a seed layer on the dead magnetic layer, and a magnetic recording layer (MRL) on the seed layer. The dead magnetic layer is configured to provide an interdiffusion region between the amorphous SUL and seed layer with a saturation magnetic moment per unit area less than $5 \times 10^{-5}$ electromagnetic unit (emu)/cm$^2$, and to produce a recording medium having an increase in tracks per inch (TPI) without significant reduction in bits per inch (BPI), and a net increase in areal density capacity (ADC) relative to a recoding medium that does not have the dead magnetic layer.

25 Claims, 6 Drawing Sheets

(56) References Cited

U.S. PATENT DOCUMENTS

| | | | |
|---|---|---|---|
| 11,475,916 B1 | 10/2022 | Tang | |
| 2002/0048693 A1* | 4/2002 | Tanahashi | G11B 5/00 |
| 2005/0014029 A1* | 1/2005 | Takenoiri | G11B 5/84 |
| | | | 427/128 |
| 2006/0234089 A1 | 10/2006 | Hintz | |
| 2007/0217071 A1* | 9/2007 | Inamura | G11B 5/667 |
| 2008/0204933 A1* | 8/2008 | Hailu | G11B 5/7369 |
| | | | 360/135 |
| 2009/0011281 A1* | 1/2009 | Oikawa | G11B 5/667 |
| | | | 428/800 |
| 2009/0190267 A1 | 7/2009 | Bian et al. | |
| 2009/0296278 A1* | 12/2009 | Inamura | G11B 5/7379 |
| | | | 428/827 |
| 2010/0021766 A1* | 1/2010 | Inamura | G11B 5/7379 |
| | | | 428/800 |
| 2010/0221580 A1* | 9/2010 | Wang | G11B 5/84 |
| | | | 204/192.1 |
| 2012/0050914 A1* | 3/2012 | Takahoshi | G11B 5/737 |
| | | | 360/110 |
| 2012/0099220 A1* | 4/2012 | Tamai | G11B 5/736 |
| | | | 360/75 |
| 2013/0235490 A1 | 9/2013 | Do et al. | |
| 2013/0288079 A1* | 10/2013 | Chang | G11B 5/1278 |
| | | | 428/828 |
| 2014/0308542 A1* | 10/2014 | Zhang | G11B 5/737 |
| | | | 428/831.2 |
| 2015/0117166 A1* | 4/2015 | Zhang | G11B 5/658 |
| | | | 369/13.5 |
| 2018/0182421 A1* | 6/2018 | Fukushima | G11B 5/7373 |
| 2018/0204591 A1* | 7/2018 | Fukushima | G11B 5/737 |
| 2018/0240487 A1* | 8/2018 | Niwa | G11B 5/65 |
| 2021/0407542 A1* | 12/2021 | Tang | G11B 5/737 |
| 2022/0358963 A1* | 11/2022 | Platt | G11B 5/7366 |

OTHER PUBLICATIONS

Suzuki, Hiroyuki, "Problems to be solved and Technological Evolution of Magnetic Recording Media", The Fourth TRIZ Symposium in Japan 2008 Paper; 2008; https://www.osaka-gu.ac.jp/php/nakagawa/TRIZ/eTRIZ/epapers/e2009Papers/eSuzukiTRIZSymp2008/27eP-Suzuki-TRIZSymp2008-090708..pdf; 6 pages.

Wang, Jian et al., "High Melting Point Metal (Pt, W) Seed Layer for Grain Size Refinement of FePt-based Heat-Assisted Magnetic Recording Media", Applied Physics Express; vol. 12, No. 2; Jan. 31, 2019; https://doi.org/10.7567/1882-0786/aafca3; 5 pages.

* cited by examiner

MAGNETIC RECORDING MEDIA WITH DEAD MAGNETIC LAYER

CROSS-REFERENCE TO RELATED APPLICATIONS

This application claims priority to and the benefit of U.S. Provisional Patent Application No. 63/469,675, entitled, "MAGNETIC RECORDING MEDIA WITH DEAD MAGNETIC LAYER," filed on May 30, 2023, the entire content of which is incorporated herein by reference as if fully set forth below in its entirety and for all applicable purposes.

FIELD

Aspects of the present disclosure relate to magnetic recording media, and more specifically to magnetic recording media designs having a dead magnetic layer that improves areal density capacity (ADC) of the recording media.

INTRODUCTION

Magnetic storage systems, such as a hard disk drives (HDDs), are utilized in a wide variety of devices in both stationary and mobile computing environments. Examples of devices that incorporate magnetic storage systems include data center storage systems, desktop computers, portable notebook computers, portable hard disk drives, network storage systems, high definition television (HDTV) receivers, vehicle control systems, cellular or mobile telephones, television set top boxes, digital cameras, digital video cameras, video game consoles, and portable media players.

Areal density capacity (ADC) is a measure of recording density of a media. ADC is the product of tracks per inch (TPI) and bits per inch (BPI) of a media. Increasing the recording density of HDDs is becoming ever more challenging. Two key approaches to increasing the ADC of HDDs have included increasing the media signal-to-noise ratio (SNR), which leads to an increase in the linear density of the recording bits (e.g., an increase in BPI), and reducing the track width, which leads to an increase in the recording track density (e.g., an increase in TPI).

In HDD media development, writability of media can be reduced to narrow the track width and thereby increase TPI. However, a reduction in track width is typically accompanied by a reduction of media SNR, which results in a reduction of BPI. In the net, media ADC is not improved.

It is desirable to provide a media design that results in an increase in TPI without significant reduction in BPI, to yield a net increase in ADC. The concepts disclosed below address these needs and others.

SUMMARY

One aspect of the present disclosure provides a magnetic recording medium configured for magnetic recording. The magnetic recording medium includes a rigid substrate, an amorphous soft magnetic underlayer (SUL) on the substrate, a dead magnetic layer on the SUL, a seed layer on the dead magnetic layer, and a magnetic recording layer (MRL) on the seed layer. The dead magnetic layer is configured to provide an interdiffusion region between the amorphous SUL and seed layer with a saturation magnetic moment per unit area less than $5 \times 10^{-5}$ electromagnetic unit (emu)/cm$^2$, and to produce a recording medium having an increase in tracks per inch (TPI) without significant reduction in bits per inch (BPI), and a net increase in areal density capacity (ADC) relative to a recoding medium that does not have the dead magnetic layer.

Another aspect of the present disclosure provides a data storage device having a magnetic recording medium and a recording head configured to write information to the magnetic recording medium. The magnetic recording medium includes a rigid substrate, an amorphous soft magnetic underlayer (SUL) on the substrate, a dead magnetic layer on the SUL, a seed layer on the dead magnetic layer, and a magnetic recording layer (MRL) on the seed layer. The dead magnetic layer is configured to provide an interdiffusion region between the amorphous SUL and seed layer with a saturation magnetic moment per unit area less than $5 \times 10^{-5}$ electromagnetic unit (emu)/cm$^2$.

Another aspect of the present disclosure provides a method for fabricating magnetic recording medium. The method includes providing a rigid substrate; providing an amorphous soft magnetic underlayer (SUL) on the substrate; providing a dead magnetic layer comprising a refractory metal on the amorphous SUL; providing a seed layer on the dead magnetic layer; and providing one or more magnetic recording layers on the seed layer.

Another aspect of the present disclosure provides a magnetic recording medium configured for magnetic recording. The magnetic recording medium includes a rigid substrate; an amorphous soft magnetic underlayer (SUL) on the substrate; a dead magnetic layer consisting essentially of a refractory metal on the SUL; a seed layer on the dead magnetic layer; and a magnetic recording layer (MRL) on the seed layer.

DETAILED DESCRIPTION

Disclosed herein are magnetic recording media configured for magnetic recording. The media may include a substrate, an amorphous soft magnetic underlayer (SUL), a seed layer having a crystalline structure, a dead magnetic layer between the amorphous SUL and the seed layer, and one or more magnetic recording layers. As described below, a dead magnetic layer is a layer of non-magnetic material. Thus, as used herein, a dead magnetic layer is a non-magnetic layer and refers to an interdiffusion region between the amorphous SUL and the seed layer that provides zero or a negligible saturation magnetic moment per unit area, e.g., less than $5 \times 10^{-5}$ electromagnetic unit (emu)/cm$^2$, in the region of the amorphous SUL and the seed layer. The amorphous SUL makes the dead magnetic layer more prone to interdiffusion, whereas the crystalline seed layer makes the dead magnetic layer less prone to interdiffusion. Thus, while the material of the dead magnetic layer diffuses with both the SUL and the seed layer, the extent of interdiffusion of the dead magnetic layer into the SUL is greater than the extent of interdiffusion of the seed layer. In any case, due to its zero or negligible saturation magnetic moment per unit area, the dead magnetic layer does not contribute to the magnetic moment of the combined SUL and seed layer.

The dead magnetic layer is configured to increase the tracks per inch (TPI) of the media without significantly reducing the bits per inch (BPI), to thereby yield a net increase in areal density capacity (ADC) of the media, where ADC is the product of TPI and BPI. This is contrary to traditional designs where an increase of TPI is typically associated with a decrease of BPI, or vice versa, netting no significant change in ADC. The technological advantage of providing media having an increased TPI with a small reduction in BPI is achieved by design characteristics of the dead magnetic layer, including the material and thickness of the dead magnetic layer. As used herein a BPI reduction is considered small relative to a TPI increase when their product, ADC, has a net gain of 1% or more.

Thus, aspects of the dead magnetic layer between the SUL and the seed layer can function in two ways. First, the dead magnetic layer reduces the magnetic moment of the SUL/seed layer, leading to an increase in TPI. Second, the dead magnetic layer reduces the magnetic cluster size of the medium, resulting in a slight BPI loss that is smaller than the TPI increase. As a result, there is a net increase in ADC.

Also disclosed herein are methods and materials for fabricating magnetic recording media having a dead magnetic layer.

Before describing the magnetic recording medium having a dead magnetic layer, and the methods and the materials that provide such dead magnetic layer, a disk drive using magnetic recording media is described.

Figure 1:
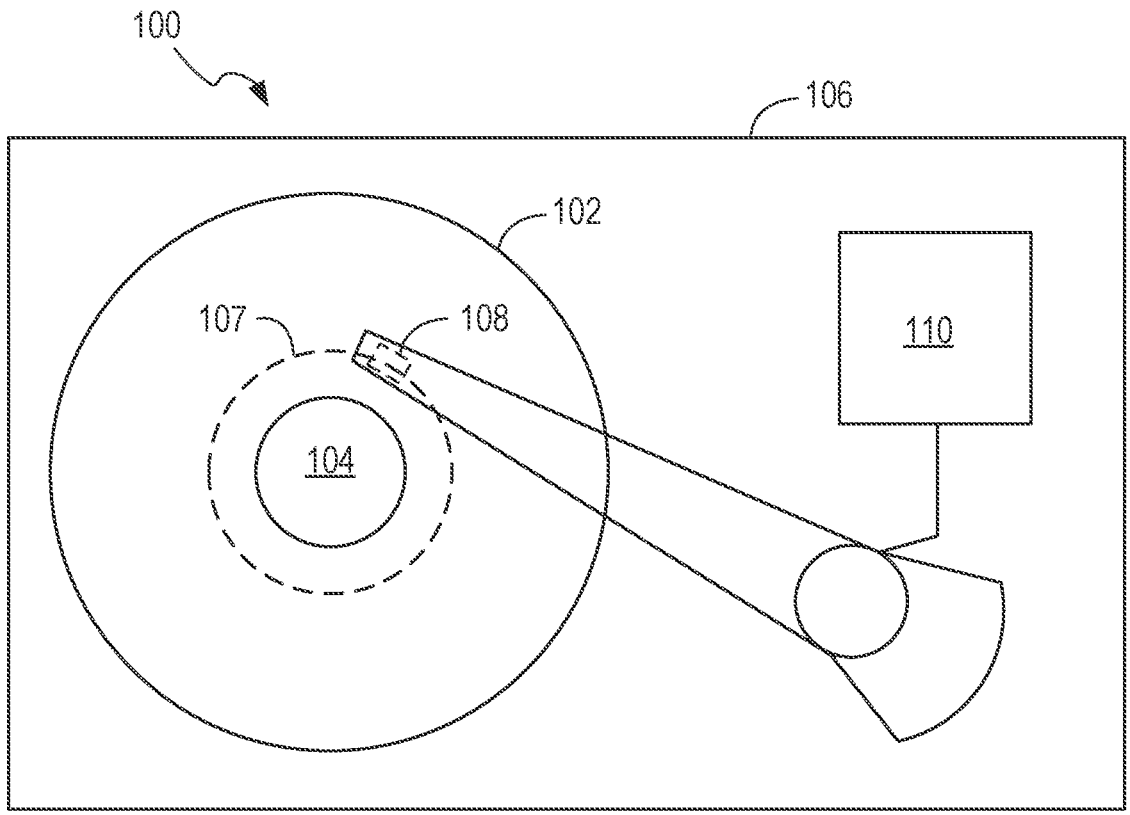
FIG. 1 is a top schematic view of a data storage device configured for magnetic recording and including a magnetic recording medium having a dead magnetic layer between a soft magnetic underlayer and a seed layer in accordance with some aspects of the disclosure.

FIG. 1 is a top schematic view of a data storage device (e.g., disk drive) 100 configured for magnetic recording and including a magnetic recording medium 102 with a dead magnetic layer configured to increase the TPI of the medium without significantly reducing the BPI, to thereby yield a net increase in ADC of the medium. In some examples, the magnetic recording medium 102 may be configured as a perpendicular magnetic recording (PMR) medium. In other examples, the magnetic recording medium 102 may be configured as a heat assisted magnetic recording (HAMR) medium, a shingled magnetic recording (SMR) medium, a microwave assisted magnetic recording (MAMR) medium, or as a flexible media in the form a magnetic tape used in a tape-based data storage drive/system.

The disk drive 100 may include one or more disks/media 102 to store data. The disk/media 102 resides on a spindle assembly 104 that is mounted to drive housing 106. Data may be stored along tracks 107 in the magnetic recording layer of disk 102. The reading and writing of data are accomplished with the head/slider 108 that may have both read and write elements. The write element is used to alter the magnetization direction of a portion of the magnetic recording layer of disk 102 and thereby write information thereto. The head 108 may have magneto-resistive (MR) based elements, such as tunnel magneto-resistive (TMR) for reading, and a write pole with coils that can be energized for writing. In operation, a spindle motor (not shown) rotates the spindle assembly 104, and thereby rotates disk 102 to position head 108 at a particular location along a desired disk track 107. The position of the head 108 relative to the disk 102 may be controlled by position control circuitry 110 of the disk drive 100.

Figure 2:
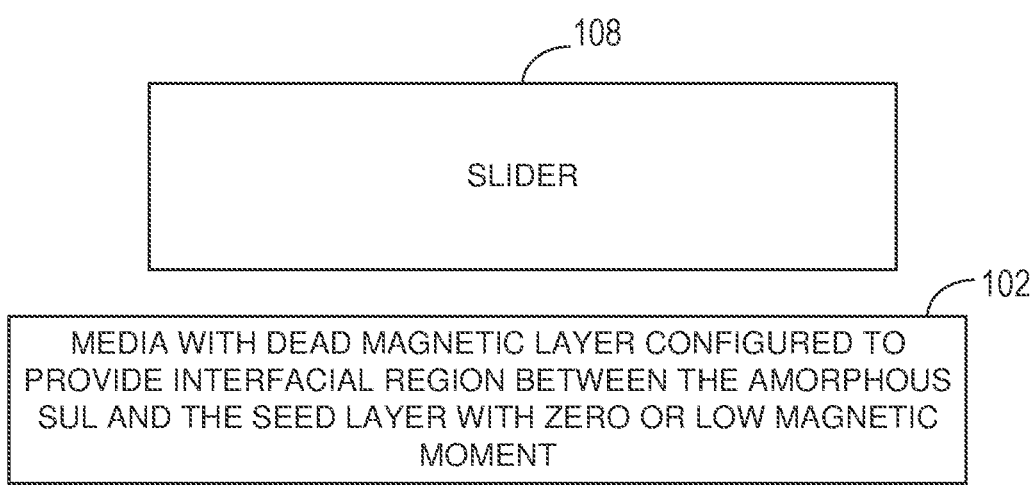
FIG. 2 is a side cross-sectional schematic view of selected components of the data storage device of FIG. 1 including the magnetic recording medium having a dead magnetic layer in accordance with some aspects of the disclosure.

FIG. 2 is a side cross-sectional schematic view of selected components of the data storage device of FIG. 1 including the magnetic recording medium 102 with a dead magnetic layer that provides an interdiffusion region between the amorphous SUL and the seed layer with zero or negligible saturation magnetic moment per unit area, that increases the TPI of the media without significantly reducing the BPI, to thereby yield a net increase in ADC of the media. The head/slider 108 is positioned above the medium 102. The head/slider 108 includes a write element and a read element (not shown) positioned along an air bearing surface (ABS) of the slider (e.g., bottom surface) for writing information to, and reading information from the medium 102. FIGS. 1 and 2 illustrate a specific example of a magnetic recording system. In other examples, embodiments of the improved media with the dead magnetic layer disclosed herein can be used in any suitable magnetic recording systems (e.g., such as PMR, HAMR, SMR, and MAMR recording systems). For example, the magnetic media of various embodiments disclosed herein may be flexible media in the form of a magnetic tape used in a tape-based data storage drive/system. For simplicity of description the various embodiments are primarily described in the context of an example HDD magnetic recording system.

Figure 3:
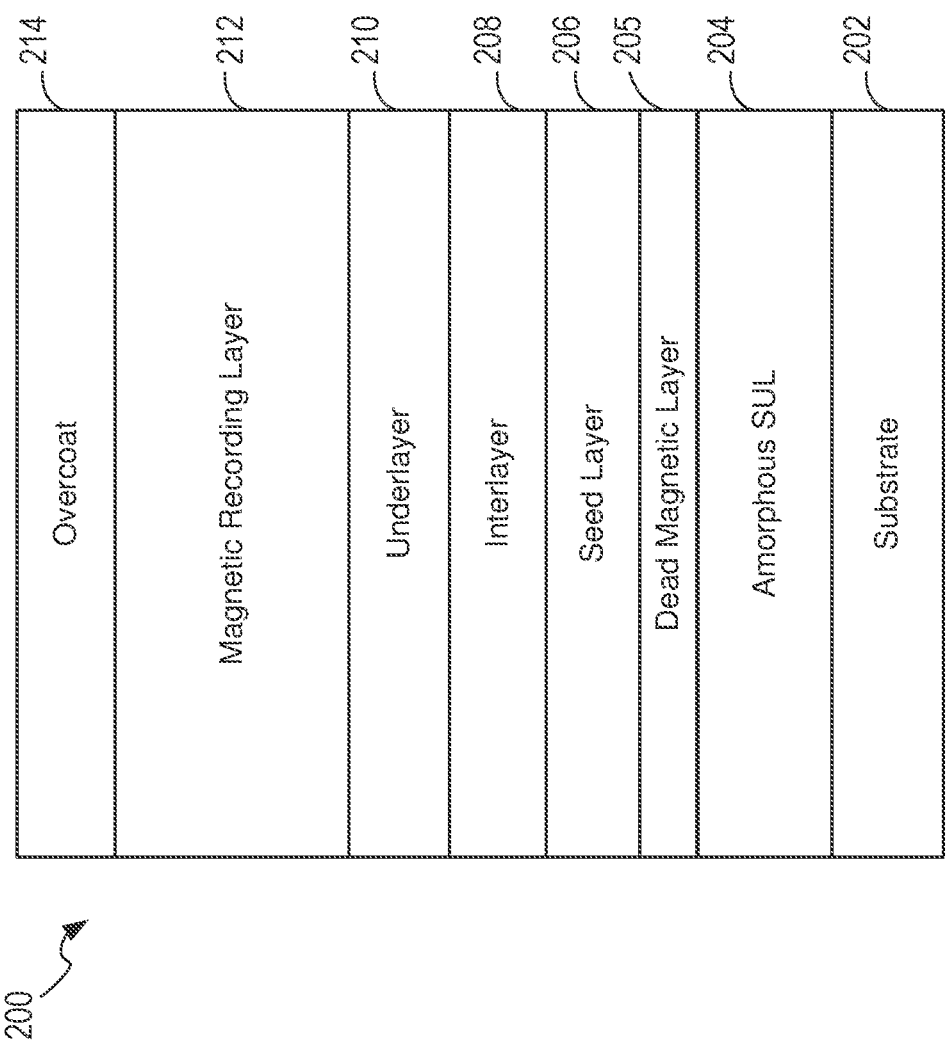
FIG. 3 is a side cross-sectional schematic view of a magnetic recording medium having a dead magnetic layer in accordance with some aspects of the disclosure.

FIG. 3 is a side cross-sectional schematic view of a magnetic recording medium 200 with a dead magnetic layer that can be used in conjunction with the disk drive 100 of FIGS. 1 and 2. In some embodiments, the magnetic recording medium 200 may be a PMR, SMR, MAMR, or HAMR medium. The magnetic recording medium 200 has a stacked structure. In sequence from the bottom, the medium 200 includes a substrate 202, an amorphous SUL 204, a dead magnetic layer 205, a seed layer 206, an interlayer 208, an underlayer 210, a magnetic recording layer structure 212, and an overcoat layer 214. In some examples, the magnetic recording layer structure 212 may have multiple magnetic recording layers and multiple non-magnetic exchange control layers.

The substrate 202 can be made of one or more materials such as an aluminum (Al) alloy, nickel phosphorus (NiP)-plated Al, glass, glass ceramic, and/or combinations thereof. In one embodiment, the substrate 202 may be a rigid substrate (e.g., glass or ceramic).

The amorphous SUL 204 can be made of one or more ferromagnetic materials with high permeability, high saturation magnetization and low coercivity, such as cobalt (Co), iron (Fe), molybdenum (Mo), tantalum (Ta), niobium (Nb), boron (B), chromium (Cr), or other soft magnetic materials, or combinations thereof. The amorphous SUL 204 may include an amorphous compound or combination of Co and Fe (e.g., a CoFe alloy) with the addition of one or more non-magnetic elements from Mo, Nb, Ta, W, and B. The SUL 204 may be configured to support magnetization of the magnetic recording layer structure 212 during data storage operations. More specifically, the amorphous SUL 204 may be configured to provide a return path for a magnetic field applied during a write operation.

The amorphous SUL 204 has a thickness in the ranges of 80 to 180 Angstroms. In one embodiment, the thickness of the amorphous SUL 204 is 150 Angstroms.

The dead magnetic layer 205 provides an interdiffusion region between the amorphous SUL 204 and the seed layer 206 with a negligible saturation magnetic moment per unit area, where a saturation magnetic moment per unit area less than $5 \times 10^{-5}$ emu/cm$^2$ is considered negligible. In some embodiments, the dead magnetic layer 205 consists essentially of a refractory material, i.e., a material that is resistant to decomposition by heat, pressure, or chemical attack. "Consists essentially of" as used herein means the material composition of the dead magnetic layer is at least 95% refractory material. Examples of refractory materials for the dead magnetic layer 205 include refractory metals such as tungsten (W), molybdenum (Mo), niobium (Nb), tantalum (Ta) and rhenium (Re). In some embodiments, the dead magnetic layer 205 is a pure material, where pure means the composition of the dead magnetic layer is at least 95% of a metal, e.g., W, Mo, Nb, Ta, Re. In some embodiments, the dead magnetic layer 205 may be an alloy of at least two refractory metals. In some embodiments, the dead magnetic layer 205 may include a non-metal refractory material.

The dead magnetic layer 205 has a thickness in the range of 4 to 12 Angstroms. In one embodiment, the thickness of the dead magnetic layer 205 is in the range of 6 to 7 Angstroms. The dead magnetic layer 205 is relatively thin in comparison to adjacent layers. For example, the dead magnetic layer 205 may have a thickness that is between 5% to 10% the thickness of the amorphous soft SUL. 204, and between 20% to 30% the thickness of the seed layer 206.

The seed layer 206 may be made of any suitable materials known in the art. The seed layer 206 has a certain lattice structure and crystallographic orientation that can determine the crystallographic orientation of a layer (e.g., interlayer 208) grown/deposited on the seed layer 206. In one embodiment, the seed layer 206 may be made of nickel (Ni) alloys. In one embodiment, the seed layer 206 may be made of ruthenium (Ru) and aluminum (Al) with or without additional elements and/or oxides. In some embodiments, the seed layer 206 is a NiFe-based crystalline alloy (of Ni/Fe having an atomic percentage ratio close to 80/20), having an fcc crystallographic structure with the (111) planes parallel to the film plane. Small amounts of refractory materials, such as W, may be added to the composition of the seed layer 206 for the purpose of decreasing the seed grain size. This may lead to a higher areal density.

The seed layer 206 has a thickness in the ranges of 20 to 40 Angstroms. In one embodiment, the thickness of the seed layer 206 is 35 Angstroms.

The interlayer 208, which is optional in some embodiments, may be formed of Co and Cr, and an additional metal, such as Ru with an atomic percentage of Ru of at least 25%, or additional metals, such as Ru and W, with the atomic percentage of W in the range of 2 to 10% and with an atomic percentage of Ru of at least 25%. In some embodiments, the interlayer 208 comprises one of CoCrRu and CoCrRuW. The particular amount of W to employ within the interlayer 308 may depend on the materials and configurations of the adjacent layers as well as the relative amounts of Co, Cr, and Ru in the interlayer. The interlayer 208, may comprise for example, one of 50% Co, 25% Cr, and 25% Ru (Co50Cr25Ru25) and 45% Co, 25% Cr, 25% Ru, and 5% W (Co45Cr25Ru25W5), wherein the respective percentages are atomic percentages.

The underlayer 210, which is optional in some embodiments, may be made of one or more materials such as Ru and/or other suitable materials known in the art.

The magnetic recording layer 212 may be made of FePt or an alloy selected from FePtX, where X is a material selected from Cu, Ni, and combinations thereof. In some examples, the crystallographic orientation of the MRL 314 can facilitate PMR, SMR, MAMR, or HAMR.

The overcoat 214 may be made of one or more materials such as carbon (C) and/or other suitable materials known in the art. In one embodiment, the medium 200 may also include a lubricant layer on the overcoat layer. In such case, the lubricant layer can be made of one or more materials such as a polymer based lubricant and/or other suitable materials known in the art.

The functional characteristics and benefits of media with a dead magnetic layer 205 can be quantified in testing. For example. Table I (shown below) summarizes magnetic core width (MCW), initial (2T) and final (1T) media signal-to-noise ratios (SNR), linear recording density (z747), track density ($TP_{cm}$), and areal density capacity ($AD_{CM}$) values resulting from conventional magnetic recording (CMR) to a test media design with a dead magnetic layer (e.g., such as dead magnetic layer 205 in media 200) relative to a comparative media design without a dead magnetic layer. The media design with the dead magnetic layer 205 included a dead magnetic layer of pure tungsten (W).

The configurations of the SUL and seed layer of the test media and the comparative media were the same, with the SUL having a material composition of 28Co-51.5Fe-10Mo-10.5Nb and a thickness of approximately 150 Angstroms (15 nm). The seed layer had a material composition of 69Ni-25Fe-5W-1Al and a thickness of approximately 35 Angstroms (3.5 nm).

As shown in Table I, the magnetic core width (MCW) for the media with the dead magnetic layer is reduced by 1.3% compared to the comparative media without a dead magnetic layer, the value for initial weighted-sum SNR ($SNR_{2T}$) for the media with the dead magnetic layer is improved by 0.08 dB compared to the comparative media without a dead magnetic layer, while the value for final weighted-sum SNR ($SNR_{1T}$) is consistent with the comparative media. As further shown in Table I, the value for linear recording density (z747) for the media with the dead magnetic layer is decreased by about 0.2% compared to the comparative media, the value for track density ($TP_{cm}$) for the media with the dead magnetic layer is increased by about 1.3% compared to the comparative media, and the value for areal density capacity ($AD_{CM}$) for the media with the dead magnetic layer is increased by 1.1% compared to the comparative media.

Table I indicates that the addition of a dead magnetic layer 205 results in a media with higher TPI (increase of 1.4%), supported by its narrower MCW (decrease by 1.2%), and only slightly lower BPI (decrease by 0.2%), consistent with just slightly lower media SNR, compared to the comparative media design. The combination of large increase in TPI and moderate decrease in BPI yields an ADC increase of 1.1%.

TABLE 1

|  | MCW nm | $SNR_{2T}$ dB | $SNR_{1T}$ dB | z747 kbpi | $TP_{cm}$ ktpi | $AD_{CM}$ $Gb/in^2$ |
|---|---|---|---|---|---|---|
| Comparative Media (without DML) | 48.8 | 4.97 | −24.0 | 2372 | 498 | 1181 |
| Test Media with a pure W DML | 48.2 | 4.89 | −24.0 | 2367 | 505 | 1194 |

Figure 4:
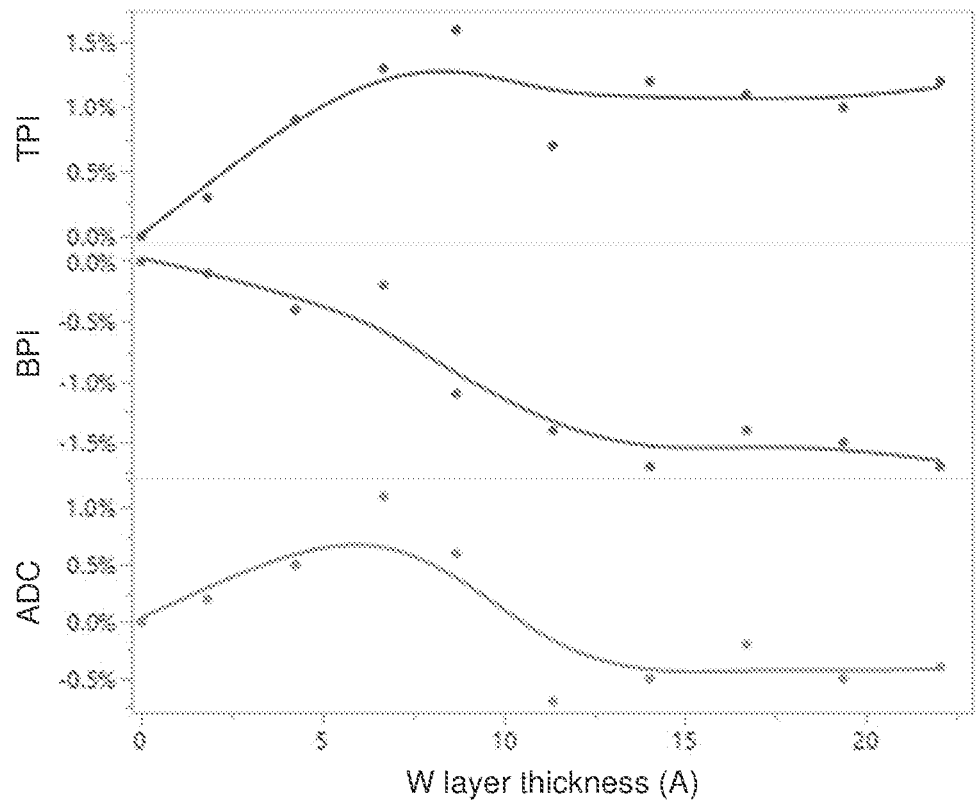
FIG. 4 is a graph of tracks per inch (TPI), bits per inch (BPI), and areal density capacity (ADC) of a magnetic recording medium having a dead magnetic layer of tungsten (W), as a function of the thickness of a dead magnetic layer in accordance with some aspects of the disclosure.

FIG. 4 is a graph of TPI, BPI, and ADC as a function of the thickness of a dead magnetic layer 205 under conventional magnetic recording (CMR). The dead magnetic layer is a layer of tungsten (W). The graph shows that TPI increases sharply as a function of the thickness of the dead magnetic layer up until a thickness of about 9 Angstrom, at which point the TPI plateaus and remains substantially flat as the thickness of the dead magnetic layer increases. In comparison, the graph shows that BPI decreases less sharply than TPI as a function of the thickness of the dead magnetic layer. The graph further shows that ADC (which is the product of TPI and BPI) reaches a maximum when the thickness of the dead magnetic layer is in the range of 6 to 7 Angstroms.

Figure 5:
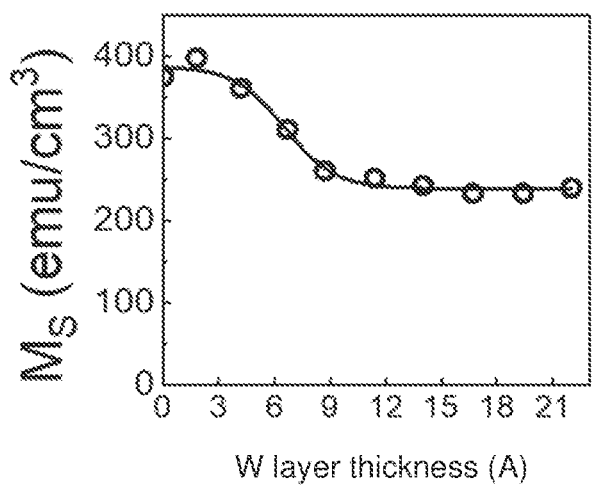
FIG. 5 is a graph of saturation magnetization (M$_S$) at the region of a soft magnetic underlayer and a seed layer as a function of the thickness of a dead magnetic layer of W in accordance with some aspects of the disclosure.

FIG. 5 is a graph of saturation magnetization ($M_S$) for a sample medium at the region of the SUL 204 and the seed layer 206 as a function of the thickness of the dead magnetic layer 205. The dead magnetic layer is a layer of tungsten (W). The graph shows a sharp decrease in saturation magnetization of the SUL 204 and the seed layer 206 as a function of the thickness of the dead magnetic layer up to a thickness of about 9 Angstrom, at which point the saturation magnetization levels off and remains relatively constant as the thickness of the dead magnetic layer increases above 9 Angstroms. The saturation magnetization ($M_S$) is in the range of 400 to 250 emu/cm$^3$, which is considered to be low. The low saturation magnetization may result from interdiffusion of the material, e.g., tungsten, of the dead magnetic layer 205, with materials of the adjacent layers, the SUL 204 and the seed layer 206, during sputter deposition.

Figure 6:
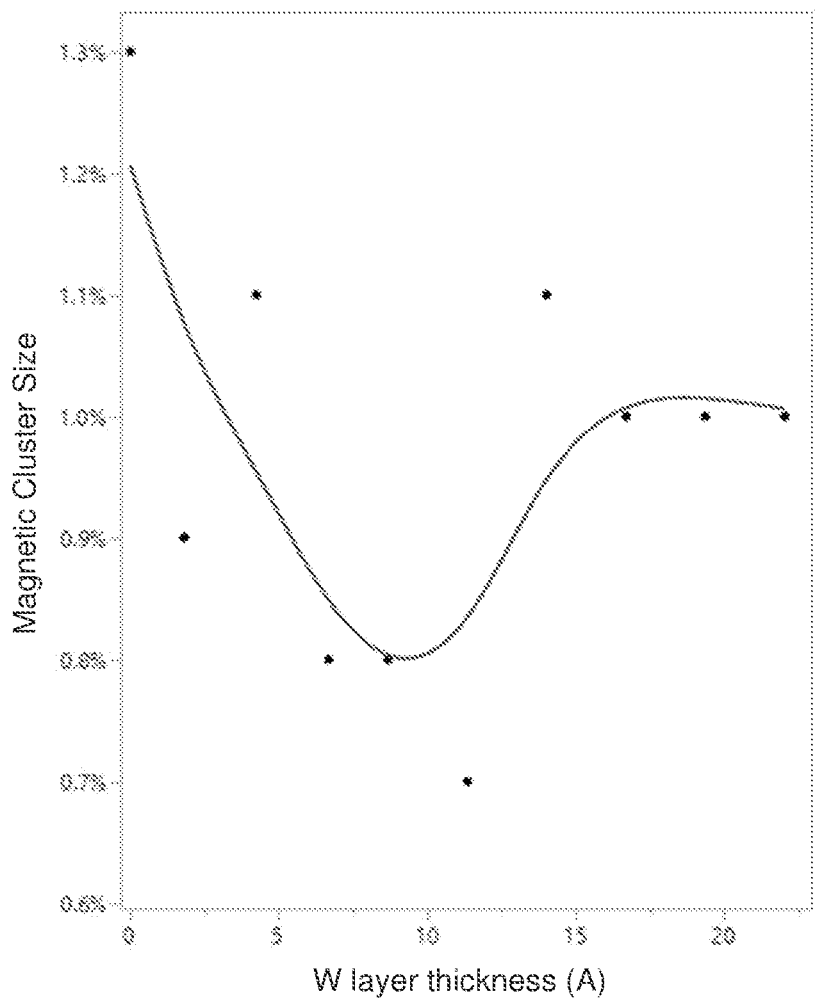
FIG. 6 is a graph of spin-stand measurement of magnetic cluster size as a function of the thickness of a dead magnetic layer of W in accordance with some aspects of the disclosure.

FIG. 6 is a graph of spin-stand measurement of magnetic cluster size as a function of the thickness of the dead magnetic layer 205. The dead magnetic layer is a layer of tungsten (W). The measurement indicates that there is a minimum of magnetic cluster at a thickness of 6 to 11 Angstroms. This serves to corroborate the low magnetization effect of the dead magnetic layer 205 at the interdiffusion region between the SUL 204 and the seed layer 206.

Figure 7:
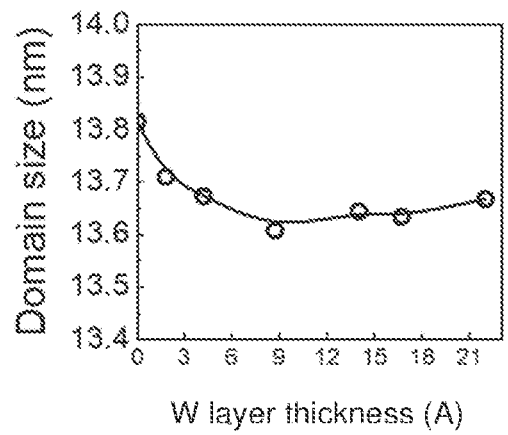
FIG. 7 is a graph of magnetometry measurement of magnetic domain size as a function of the thickness of a dead magnetic layer of W in accordance with some aspects of the disclosure.

FIG. 7 is a graph of magnetometry measurement of magnetic domain size as a function of the thickness of the dead magnetic layer 205. Magnetometry measurement shows that a shallow minimum in the domain size at a thickness of 6 to 9 Angstroms. This also serves to corroborate the low magnetization effect of the dead magnetic layer 205 at the interdiffusion region between the SUL 204 and the seed layer 206.

While not bound by any particular theory, it may be helpful to provide some background on magnetic cluster size and magnetic domain size. A magnetic cluster is a region of the film having the same orientation of the magnetization with respect to the film plane subsequent to a sample demagnetization. The cluster size is the in-plane dimension of the magnetic cluster. The magnetic cluster can also be called "magnetic domain" based on the analogy of a granular medium of small grain size with a continuous film. Actually, the methodology of extracting the magnetic cluster size is based on the assumption that the film is continuous. The magnetic cluster, or the magnetic domain, may encompass one or several neighboring grains having the same polarity/orientation of their magnetization along the perpendicular to the film plane.

The domain size is the result of the balance between two terms contributing to the free energy of the film (grain system): The first term is the magnetostatic energy. This term acts in the direction of demagnetizing the film along the direction perpendicular to the film plane, creating a fine domain structure similar to a chessboard structure, with small squares each of them representing a domain or a cluster. The effect of this term is to randomize the orientation of grains along the perpendicular to the film plane, thereby reducing the domain size. The second term is the exchange energy. This term acts in the direction to maintain the same orientation of the magnetization for neighboring grains. It acts in the direction of reducing the number of domain walls (that can be visualized as the boundaries between the squares of the chessboard). This term has the tendency to increase the domain size by replacing the chessboard square with a stripe domain structure which can be visualized as a collection of parallel stripes of alternating polarity or orientation of the magnetization along the perpendicular to the film plane. The higher is the exchange between the grains, the larger is the width of the stripes. The domain size in this case is the width of the stripes. Given that in the derivation of this size the film is assumed to be continuous, not discrete (as it is in reality, being granular), it is more natural to use the denomination of domain size instead of cluster size. However, both denominations are equivalent. The derivation of the magnetic domain size is based on the knowledge of the mean-interaction field factor of the medium and also on the a priori knowledge of the domain pattern shape (either chessboard or stripe, corresponding to the extremes of low exchange coupling and high exchange coupling respectively). The methodology is described in the publication. "Evaluation of intergranular exchange coupling and magnetic domain size in CoCrPt-SiOX thin films with perpendicular anisotropy," C. Papusoi, M. Desai, R. Acharya, J. Phys. D: Appl. Phys. 48(21) 215005 (2015).

Figure 8:
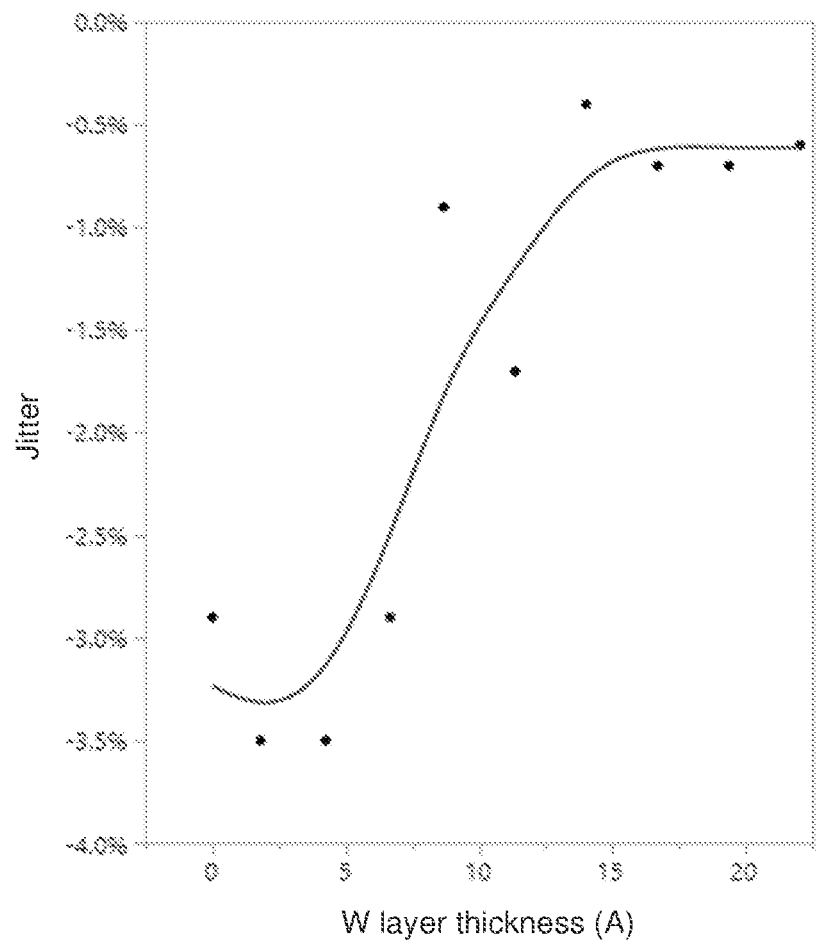
FIG. 8 is a graph of spin-stand measurement of jitter as a function of the thickness of a dead magnetic layer of W in accordance with some aspects of the disclosure.

FIG. 8 is a graph of spin-stand measurement of jitter as a function of the thickness of the dead magnetic layer 205. The dead magnetic layer is a layer of tungsten (W). This measurement shows that jitter is consistently low, e.g., less than-2.0%, when the thickness of the dead magnetic layer 205 is less than 8 Angstroms.

Figure 9:
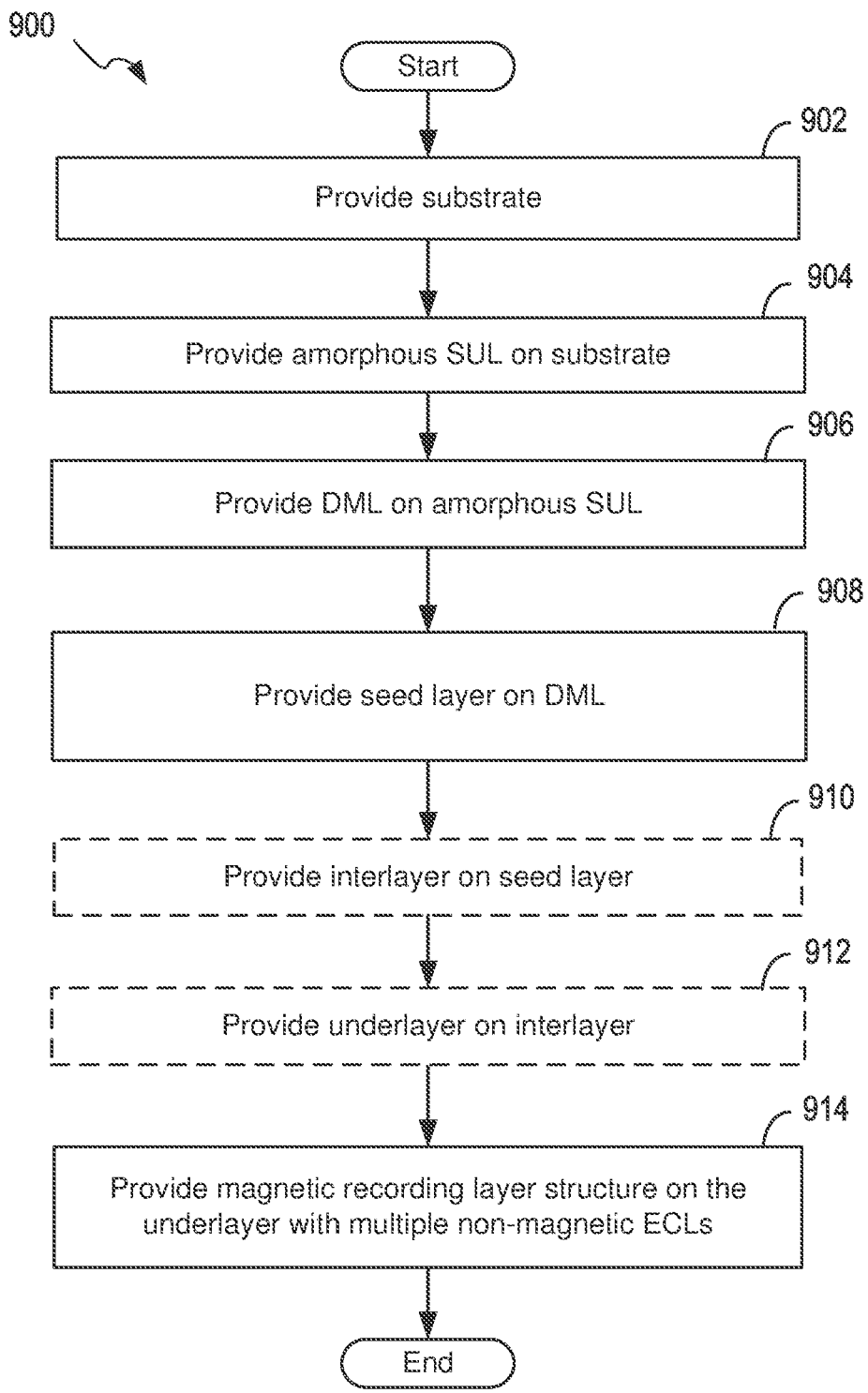
FIG. 9 is a flowchart of a process for fabricating a magnetic recording medium having a dead magnetic layer in accordance with some aspects of the disclosure.

FIG. 9 is a flowchart of a process 900 for fabricating a magnetic recording medium including a magnetic recording layer structure. In particular embodiments, the process 900 can be used to fabricate the magnetic recording media described above including medium 102 and/or medium 200.

At block 902, the process provides a substrate. The substrate can be made of one or more materials such as an Al alloy, NiP-plated Al, glass, glass ceramic, and/or combinations thereof.

At block 904, a soft magnetic underlayer (e.g., SUL 204 in FIG. 3) is provided on the substrate. The amorphous SUL 204 can be made of one or more materials with high permeability, high saturation magnetization and low coercivity, such as cobalt (Co), iron (Fe), molybdenum (Mo), tantalum (Ta), niobium (Nb), boron (B), chromium (Cr), or other soft magnetic materials, or combinations thereof. The amorphous SUL 204 may include an amorphous compound or combination of Co and Fe (e.g., a CoFe alloy) with the addition of one or more elements from Mo, Nb, Ta, W, and B.

At block 906, a dead magnetic layer (e.g., DML 205 in FIG. 3) is provided on the amorphous SUL 204. The material of the dead magnetic layer inter-diffuses with material of the amorphous SUL 204. The dead magnetic layer may be formed of a refractory material. In some embodiments the dead magnetic layer comprises a pure refractory material selected from: tungsten (W), molybdenum (Mo), niobium (Nb), tantalum (Ta) and rhenium (Re). In some embodiments the dead magnetic layer comprises a refractory alloy material comprising at least two of: tungsten (W), molybdenum (Mo), niobium (Nb), tantalum (Ta) and rhenium (Re). The dead magnetic layer may be deposited on the soft magnetic underlayer by sputter deposition.

At block 908, a seed layer (e.g., seed layer 206 in FIG. 3) is provided on the dead magnetic layer. The material of the dead magnetic layer inter-diffuses with material of the seed layer. In one embodiment, the seed layer may be made of Ni alloys. In one embodiment, the seed layer may be made of Ru and Al with or without additional elements and/or oxides.

At block 910, an interlayer (e.g., interlayer 208 in FIG. 3) may optionally be provided on the second seed layer 207*b*. The interlayer may be formed of Co and Cr, and an additional metal, such as Ru with an atomic percentage of Ru of at least 25%, or additional metals, such as Ru and W, with the atomic percentage of W in the range of 2 to 10% and with an atomic percentage of Ru of at least 25%.

At block 912, an underlayer (e.g., underlayer 210 in FIG. 3) may optionally be provided on the interlayer. The underlayer may be made of one or more materials such as Ru and/or other suitable materials known in the art.

At block 914, a magnetic recording layer structure (e.g., structure 212 in FIG. 3) is provided on the underlayer. In some embodiments the magnetic recording layer structure has or includes multiple non-magnetic ECLs. In one embodiment, an overcoat (e.g., overcoat layer 214 in FIG. 3) may be provided on the magnetic recording layer structure.

In some embodiments, the processes herein can perform the sequence of actions in a different order. In other embodiments, the processes can skip one or more of the actions. In still other embodiments, one or more of the actions are performed simultaneously. In some embodiments, additional actions can be performed. For example, in one aspect, the process may include any additional actions needed to fabricate the magnetic recording layer structure.

In several embodiments, the forming or deposition of such layers can be performed using a variety of deposition sub-processes, including, but not limited to physical vapor deposition (PVD), direct current (DC) magnetron sputter deposition, ion beam deposition, radio frequency sputter deposition, or chemical vapor deposition (CVD), including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

While the above description contains many specific embodiments, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Various components described in this specification may be described as "including" or made of certain materials or compositions of materials. In one aspect, this can mean that the component consists of the particular material(s). In another aspect, this can mean that the component comprises the particular material(s).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. It is further noted that the term "over" as used in the present application in the context of one component located over another component, may be used to mean a component that is on another component and/or in another component (e.g., on a surface of a component or embedded in a component). Thus, for example, a first component that is over the second component may mean that (1) the first component is over the second component, but not directly touching the second component, (2) the first component is on (e.g., on a surface of) the second component, and/or (3) the first component is in (e.g., embedded in) the second component. The term "about 'value X'", or "approximately value X," as used in the disclosure shall mean within 10 percent of the 'value X'. For example, a value of about 1 or approximately 1 would mean a value in a range of 0.9-1.1. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range. In the disclosure various values (e.g., value X) may be specified, described and/or claimed. In one embodiment, it should be understood that the value X may be exactly equal to X. In one embodiment, it should be understood that the value X may be "about X." with the meaning noted above.

What is claimed is:

1. A magnetic recording medium comprising:
a rigid substrate;
an amorphous soft magnetic underlayer (SUL) on the rigid substrate;
a non-magnetic layer on the SUL, the non-magnetic layer comprising a thickness in a range of 4 to 12 Angstroms;
a seed layer on the non-magnetic layer; and
a magnetic recording layer (MRL) on the seed layer,
wherein a material of the non-magnetic layer is diffused with both the amorphous SUL and the seed layer to provide an interdiffusion region with a saturation magnetic moment per unit area greater than zero electromagnetic unit (emu)/cm$^2$ and less than $5\times10^{-5}$ emu/cm$^2$.

2. The magnetic recording medium of claim 1, wherein an extent of interdiffusion of the non-magnetic layer material with the amorphous SUL is greater than an extent of interdiffusion of the non-magnetic layer material with the seed layer.

3. The magnetic recording medium of claim 1, wherein the non-magnetic layer material comprises a refractory metal.

4. The magnetic recording medium of claim 1, wherein the non-magnetic layer material comprises a pure refractory metal selected from the group consisting of pure tungsten (W), pure molybdenum (Mo), pure niobium (Nb), pure tantalum (Ta) and pure rhenium (Re).

5. The magnetic recording medium of claim 1, wherein the non-magnetic layer material comprises a refractory alloy comprising at least two of: tungsten (W), molybdenum (Mo), niobium (Nb), tantalum (Ta) and rhenium (Re).

6. The magnetic recording medium of claim 1, wherein the non-magnetic layer material comprises substantially pure W.

7. The magnetic recording medium of claim 1, wherein the non-magnetic layer material consists of pure W.

8. The magnetic recording medium of claim 1, wherein:
the amorphous SUL has a thickness in a range of 80 to 180 Angstroms.

9. The magnetic recording medium of claim 8, wherein the amorphous SUL comprises one or more elements selected from the group consisting of: cobalt (Co), iron (Fe), molybdenum (Mo), tantalum (Ta), niobium (Nb), boron (B), chromium (Cr), and combinations thereof.

10. The magnetic recording medium of claim 1, wherein:
the seed layer has a thickness in a range of 20 to 40 Angstroms.

11. The magnetic recording medium of claim 1, wherein the seed layer comprises one or more elements or alloys selected from the group consisting of: nickel (Ni) alloys, ruthenium (Ru) and aluminum (Al), or combinations thereof.

12. The magnetic recording medium of claim 1, wherein:
the non-magnetic layer is directly on the SUL and consists of pure W; and
the seed layer is directly on the non-magnetic layer.

13. The magnetic recording medium of claim 1, wherein an areal density capacity (ADC) of the magnetic recording medium is greater than that of a comparative magnetic recording medium identical to the magnetic recording medium except that the comparative magnetic recording medium does not include a non-magnetic layer.

14. The magnetic recording medium of claim 1, wherein a magnetic cluster size of the magnetic recording medium is smaller than that of a comparative magnetic recording medium identical to the magnetic recording medium except that the comparative magnetic recording medium does not include a non-magnetic layer.

15. A data storage device, comprising:
the magnetic recording medium of claim 1; and
a recording head configured to write information to the magnetic recording medium.

16. A method for fabricating magnetic recording media, comprising:
providing a rigid substrate;
providing an amorphous soft magnetic underlayer (SUL) on the rigid substrate;
providing a non-magnetic layer comprising a thickness in a range of 4 to 12 Angstroms and comprising a refractory metal on the amorphous SUL;
providing a seed layer on the non-magnetic layer; and
providing one or more magnetic recording layers on the seed layer,
wherein a material of the non-magnetic layer is diffused with both the amorphous SUL and the seed layer to provide an interdiffusion region with a saturation magnetic moment per unit area greater than zero electromagnetic unit (emu)/cm$^2$ and less than $5\times10^{-5}$ emu/cm$^2$.

17. The method of claim 16, wherein the non-magnetic layer material comprises a pure refractory metal selected from the group consisting of pure tungsten (W), pure molybdenum (Mo), pure niobium (Nb), pure tantalum (Ta) and pure rhenium (Re).

18. The method of claim 16, wherein the non-magnetic layer material comprises a refractory alloy comprising at least two of: tungsten (W), molybdenum (Mo), niobium (Nb), tantalum (Ta) and rhenium (Re).

19. The method of claim 16, wherein the non-magnetic layer material comprises substantially pure W.

20. The method of claim 16, wherein the non-magnetic layer material consists of pure W.

21. The method of claim 16, wherein:
the amorphous SUL has a thickness in a range of 80 to 180 Angstroms; and
the seed layer has a thickness in a range of 20 to 40 Angstroms.

22. The method of claim 16, further comprising:
providing an interlayer on the seed layer; and
providing an underlayer on the interlayer,
wherein the providing the one or more magnetic recording layers on the seed layer comprises providing the one or more magnetic recording layers on the underlayer.

23. A magnetic recording medium comprising:
a rigid substrate;
an amorphous soft magnetic underlayer (SUL) on the rigid substrate;
a non-magnetic layer consisting essentially of pure tungsten on the SUL;
a seed layer on the non-magnetic layer; and
a magnetic recording layer (MRL) on the seed layer,
wherein the composition of the non-magnetic layer consisting essentially of pure tungsten is at least 95% tungsten and the pure tungsten of the non-magnetic layer is diffused with both the amorphous SUL and the seed layer to provide an interdiffusion region with a saturation magnetic moment per unit area greater than zero electromagnetic unit (emu)/cm$^2$ and less than $5\times10^{-5}$ emu/cm$^2$.

24. The magnetic recording medium of claim 23, wherein:
the amorphous SUL has a thickness in a range of 80 to 180 Angstroms;
the seed layer has a thickness in a range of 20 to 40 Angstroms; and
the non-magnetic layer has a thickness between 5% to 10% of the thickness of the amorphous SUL, and between 20% to 30% of the thickness of the seed layer.

25. The magnetic recording medium of claim 23, wherein an extent of interdiffusion of the non-magnetic layer material with the amorphous SUL is greater than an extent of interdiffusion of the non-magnetic layer material with the seed layer.

\* \* \* \* \*